United States Patent [19]
Defores

[11] 3,765,782
[45] Oct. 16, 1973

[54] ASSEMBLY DEVICE FOR THE BODY AND END SECTION OF A FOUNTAIN PEN

[75] Inventor: Eugene Defores, Nantes, France

[73] Assignee: Societe Dite: Societe Le Foyer, Paris, France

[22] Filed: Mar. 27, 1972

[21] Appl. No.: 238,037

[30] Foreign Application Priority Data
July 22, 1971 France .................. 7126867

[52] U.S. Cl. .................................. 401/251
[51] Int. Cl. ................................... B43k 5/00
[58] Field of Search ......... 401/132–135, 156–169, 401/209, 198, 199, 202, 262, 221–234, 249–251, 241; 285/DIG. 72

[56] References Cited
UNITED STATES PATENTS

| | | | |
|---|---|---|---|
| 2,961,999 | 11/1960 | Torchi | 401/134 X |
| 3,606,556 | 9/1971 | Green et al. | 401/133 X |
| 3,186,416 | 6/1965 | Kolts | 401/209 X |
| 2,982,586 | 5/1961 | Gliebe | 285/DIG. 22 |

*Primary Examiner*—Lawrence Charles
*Attorney*—Hane, Baxley & Spiecens

[57] ABSTRACT

A fountain pen of the type having a forward section carrying a point and adapted to be joined to a cartridge and a body which is adapted to receive the cartridge. The forward section includes a skirt formed of resilient material with a protuberance thereon and is adapted to be received in the interior of the body. In assembly, which is effected by relative longitudinal displacement of the body and forward section, the portion of the forward section carrying the protuberance is displaced laterally towards the axis of the pen into engagement with the cartridge which returns the portion carrying the protuberance to its normal position when the latter is in alignment with an aperture of the body. A portion of the forward section may carry indicia or the like which are visible through the aperture when the parts are in assembled position.

3 Claims, 4 Drawing Figures

PATENTED OCT 16 1973 3,765,782
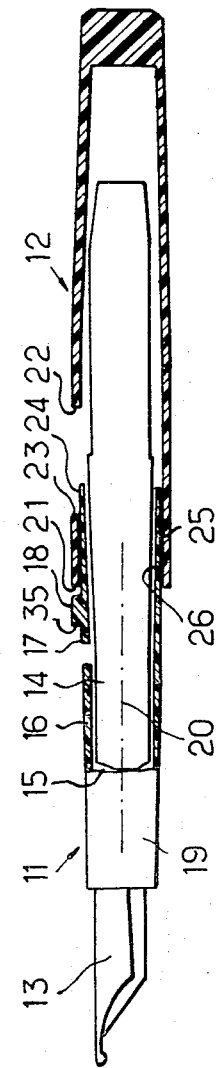
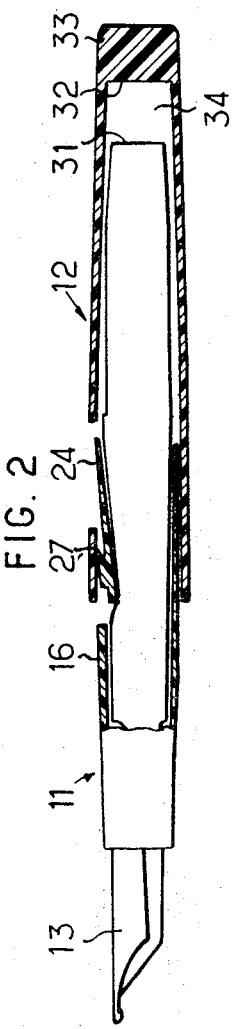
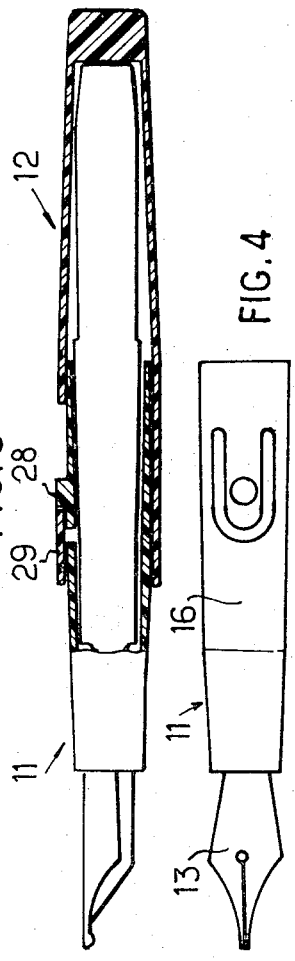
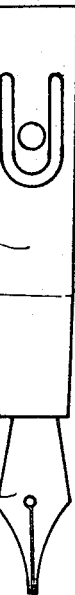

ASSEMBLY DEVICE FOR THE BODY AND END SECTION OF A FOUNTAIN PEN

The present invention relates to an assembly device for a fountain pen body and an end section, as well as a fountain pen with such an assembly device.

The majority of fountain pens now in use are produced by the screw assembly of a forward part or section carrying the point to which the cartridge is connected and a second part or body in which the cartridge is received. Such an assembly is not always satisfactory. Screwing and unscrewing requires a relatively long time, and assembly cannot be ensured after prolonged use when the screw threads are worn which is frequently the case when either of the parts is of plastics material as is common.

An aim of the present invention is to provide a device which overcomes these disadvantages in which the assembly and diassembly are fast and remain operative even after prolonged use.

According to the invention tongue and aperture means are provided on the two parts to be assembled and adapted to be fitted together or taken apart by a relative longitudinal movement relative to each other.

According to a preferred embodiment the tongue is carried on the forward section and results from an opening in a skirt which is part of the section.

In an embodiment in which the aperture is provided on the body, the aperture enables the viewing of a portion of the forward section on which are carried marks or inscriptions, such as the initials of the owner of the fountain pen, or any other kind of insignia.

The description which follows, made by way of example, refers to the accompanying drawing, in which:

FIG. 1 is a side view partly in section and partly in elevation of a fountain pen during a step of assembling the section with the body;

FIG. 2 is a view similar to that of FIG. 1 but for another assembly step;

FIG. 3 is a further view similar to that of FIG. 1 showing the parts in assembled position; and FIG. 4 is a front elevation view of the section.

The present fountain pen results from the assembly of a forward part or section 11 and a rearward part or body 12. The forward section 11 carries the point or nib 13: the cartride 14 is connected to the forward section. After the zone of connection 15 between the cartridge 14 and the forward section 11, the forward section is formed by a barrel 16 having a tongue 17 with a boss 18 extending into an opening in the barrel . The material constituting the barrel 16 is also that of the forward section 11 and is chosen so that the tongue is resilient enabling it to move laterally towards and away from the axis 20 of the barrel 16.

The body 12 of the fountain pen of plastics material or metal has at a certain distance from its forward edge 21 an oblong aperture 22 with a forward edge 23.

In order to assemble the forward section 11 to the body 12, it is simply necessary after joining the cartridge 14 to the forward section 11 to insert this combination into the body 12. The diameter of the outer surface 24 of the rear skirt 25 of the forward section 11 is slightly smaller than the interior surface 26 of the body 12 such that the insertion can be effected without interference until the rear edge 27 of the boss 18 comes into contact with the forward edge 21 of the body 12. By continuing the insertion operation, the boss 18 is moved inwardly towards the axis 20 which is made possible by the elasticity of the cartridge 14 or the suitable shape of the tongue 17, and the boss 18 slides into the interior of the forward portion of the body 12 as shown in FIG. 2.

When the boss 18 comes into a position opposite an aperture 22 1n the bpdy 12, the tongue 24 is resiliently returned to its initial position and the outer edge 28 of the boss comes in line with the outer surface 29 of the body 12. In this position and in case the cartridge partakes in bending, the closed end of the cartridge 14 comes into contact with the closed end of the body, the length of the space 34 formed in the body, and the length of the cartridge are chosen so that due to the effect of pressure developed by force exerted by the user when the cartridge penetrates towards the closed end of the body 12, the cartridge is slightly compressed and the forward edge 35 of the boss 18 comes in line with forward edge 23 of the aperture 22. The elasticity of the material forming the cartridge 14 which thus maintains the end 31 of the cartridge against the closed interior wall 32 at the end 33 of the body and the forward edge 35 of the boss 18 against the forward edge 23 of the aperture 22.

The aperture 22 is preferably large enough so that an inscription carried on the rear end 24 of the skirt 16 of the forward section 11 appears through the aperture, this inscription may be, for example, the initials of the owner.

The disassembly is effected inversely by exerting a force radially inwardly on the lateral face 28 of the boss 18 which enables the cartridge and the forward section to slide in the opposite direction with respect to the body.

In an alternative embodiment which is not illustrated the body is provided with a notch which enables at the end of the insertion assembly step relative rotation of the parts to obtain an additional guard against unvoluntary disassembly.

What is claimed is:

1. An arrangement for assembling a fountain pen nib section on a pen barrel, said arrangement comprising: a tubular pen barrel open at one end and closed at the other end, a tubular nib section having an outer diameter slidably fitting the pen barrel, said nib section including a lengthwise elongate flexible tongue cut out of the wall material of the nib section and outwardly protruding from the peripheral outline thereof, a stud outwardly protruding from the tongue, the pen barrel having in its wall an opening spaced apart from the rim of the open end of the pen barrel, insertion of the nib section into the barrel causing temporary inward deflection of the tongue into a substantially flush position with the section wall and return of the tongue to its protruding position when the tongue is in registry with the barrel opening, thereby releasably locking the pen section to the barrel.

2. The arrangement according to claim 1 wherein a cartridge made of an elastic material is supported by said nib section, said stud on the tongue and said opening in the barrel wall being correlated with respect to configuration and location so that when the stud is in locking engagement with the opening in the pen barrel one end of the cartridge abuts against the closed end of the pen barrel and the other end presses against the facing edge of the stud for urging the same against the respective transverse edge of the opening, thereby impeding relative axial displacement of the nib section and the pen barrel.

3. The arrangement according to claim 2 wherein said opening in the barrel wall has a peripheral outlines selected to expose an area of the underlying outer surface of the nib section for accommodating application of a legend on said area.

* * * * *